(12) United States Patent
Lucchi (10) Patent No.: US 8,997,975 B2
(45) Date of Patent: Apr. 7, 2015

(54) SPROCKETS FOR A FLEXIBLE CONVEYOR BELT AND CONVEYOR BELT SYSTEM

(75) Inventor: Marco Lucchi, Munchestein (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 12/886,460

(22) Filed: Sep. 20, 2010

(65) Prior Publication Data

US 2012/0037479 A1 Feb. 16, 2012

Related U.S. Application Data

(63) Continuation-in-part of application No. 12/856,578, filed on Aug. 13, 2010, now abandoned.

(51) Int. Cl.
*B65G 23/06* (2006.01)

(52) U.S. Cl.
CPC ....................................... *B65G 23/06* (2013.01)

(58) Field of Classification Search
CPC ......... B65G 23/06; B65G 15/42; B65G 23/04
USPC .................. 198/834, 835, 850, 853
See application file for complete search history.

(56) References Cited

U.S. PATENT DOCUMENTS

| | | | |
|---|---|---|---|
| 1,668,778 A | 5/1928 | Menningen | |
| 1,922,357 A | 8/1933 | Divney et al. | |
| 1,934,819 A | 11/1933 | Rorabeck | |
| 3,016,235 A | 1/1962 | Cnudde | |
| 3,017,986 A | 1/1962 | Ackles | |
| 3,031,895 A | 5/1962 | Kindig | |
| 3,314,526 A * | 4/1967 | Price et al. ................. | 198/834 |
| 3,680,684 A | 8/1972 | Purdy et al. | |
| 4,218,932 A | 8/1980 | McComber | |
| 4,816,010 A | 3/1989 | Reynolds | |
| 5,203,861 A | 4/1993 | Irwin et al. | |
| 6,223,905 B1 | 5/2001 | Buisman et al. | |
| 6,367,613 B1 | 4/2002 | Montgomery | |
| 6,740,172 B1 | 5/2004 | Griffiths et al. | |
| RE38,607 E | 10/2004 | Guldenfels et al. | |
| 6,978,880 B2 | 12/2005 | Barrett | |
| 7,055,675 B2 | 6/2006 | Behymer et al. | |
| 7,111,724 B2 | 9/2006 | Donnenhoffer | |
| 7,134,545 B1 * | 11/2006 | Smith ............................ | 198/834 |
| 7,147,099 B2 | 12/2006 | Guernsey et al. | |
| 7,225,915 B2 | 6/2007 | Kelly et al. | |
| 7,370,749 B2 | 5/2008 | Smith | |
| 7,407,051 B1 | 8/2008 | Farris et al. | |
| 2004/0222072 A1 | 11/2004 | Verdigets et al. | |
| 2006/0084540 A1 | 4/2006 | Kanaris | |
| 2007/0084699 A1 | 4/2007 | Smith | |
| 2009/0050185 A1 | 2/2009 | Guldenfels et al. | |

FOREIGN PATENT DOCUMENTS

CN 101132975 1/2005
CN 1689938 11/2005

(Continued)

*Primary Examiner* — James R Bidwell
(74) *Attorney, Agent, or Firm* — Hodgson Russ LLP (57) ABSTRACT

A sprocket is provided, the sprocket having a body with a central opening for engaging a shaft and rotating about an axis. The sprocket has a plurality of teeth disposed around the periphery of the body. The teeth are angularly spaced about the axis such that each tooth is spaced from the adjacent teeth by a first opening. Each tooth has a belt-contacting surface which is convex in shape such that the outer-most periphery of the sprocket is generally circular. The belt-contacting surfaces of the teeth guide the belt around the periphery of the sprocket in order to minimize the ability of the belt to buckle.

17 Claims, 6 Drawing Sheets

(56) References Cited

FOREIGN PATENT DOCUMENTS

| | | |
|---|---|---|
| CN | 101400923 | 4/2009 |
| EP | 0569071 | 11/1993 |
| EP | 0726215 B1 | 5/2000 |
| FR | 2601660 | 7/1986 |
| GB | 624204 | 5/1949 |
| WO | 2005009874 | 2/2005 |
| WO | 2007092774 | 8/2007 |
| WO | 2008/006232 A1 | 1/2008 |
| WO | 2008095322 | 8/2008 |

\* cited by examiner

SPROCKETS FOR A FLEXIBLE CONVEYOR BELT AND CONVEYOR BELT SYSTEM

CROSS-REFERENCE TO RELATED APPLICATION

The present application is a continuation-in-part of U.S. patent application Ser. No. 12/856,578 filed on Aug. 13, 2010, now abandoned the disclosure of which is incorporated herein by reference.

FIELD OF THE INVENTION

The present invention relates generally to conveyor belts, and more specifically to sprockets used to propel conveyor belts in environments where cleaning systems must be used to maintain hygiene.

BACKGROUND OF THE INVENTION

Traditional light conveyor belts are generally constructed from fabrics coated by plastics or rubber, or plastic sheets. In applications where hygiene and cleanliness are important, such as food processing plants, these conveyor belts are preferably made from monolithic plastics or otherwise sealed such that no contaminants can enter into the body of the belt, in order to prevent bacterial growth and other hygienic issues. Additionally, cleaning systems, which spray cleaning fluid on the sprockets and belts of such conveyors, are used to prevent the spread of contaminants.

Figure 9:
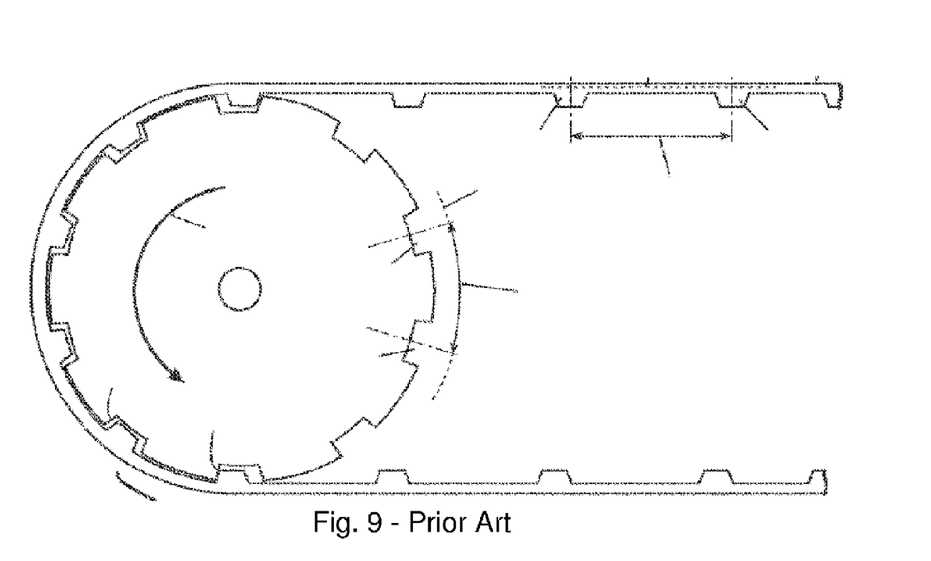
FIG. 9 is a side elevational view of another prior art sprocket with a flexible belt engaged thereon.

Such conveyor belts are generally provided with transverse ribs on the underside of the belt in order to allow drive sprocket(s) to engage the ribs and better propel the belt. FIG. 9 shows the current art of drive sprocket used to engage the ribs of a belt and drive the belt (see, e.g., U.S. Patent Application Publication No. 2006/0144676). As can be seen in FIG. 9, current sprockets a generally cylindrical in shape and have grooves which engage the ribs of the belt.

However, a sprocket as described above suffers from several disadvantages in environments where cleaning systems are used to maintain hygiene. First, the belt sits tightly on the sprocket, leaving little to no gap between the sprocket and the underside of the belt. In this case, debris and contaminants are squeezed into the small gaps causing great difficulty in cleaning the affected areas. Additionally, in many cases, two or more sprockets are used to engage a belt, and the above-described sprockets offer few options for passing cleaning fluid to the area between sprockets.

Figure 7A:
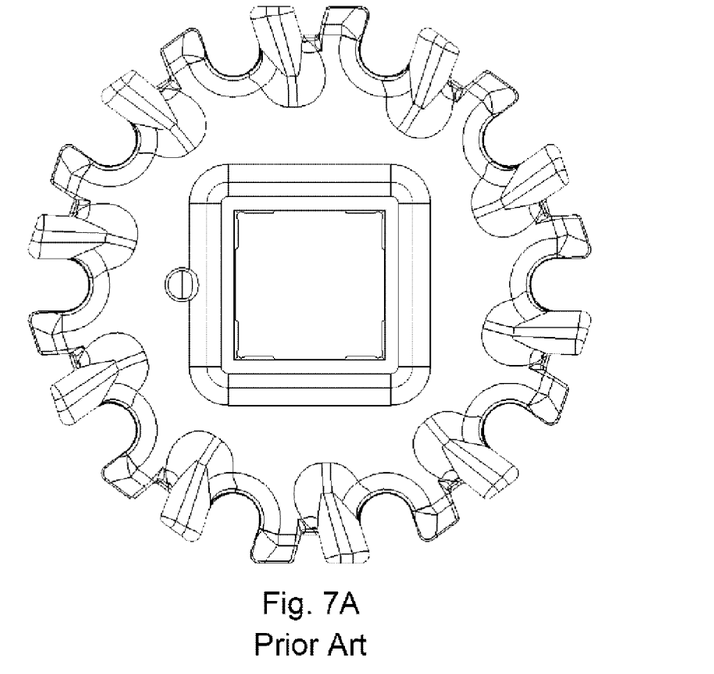
FIG. 7A is a side elevational view of a prior art sprocket.
Figure 7B:
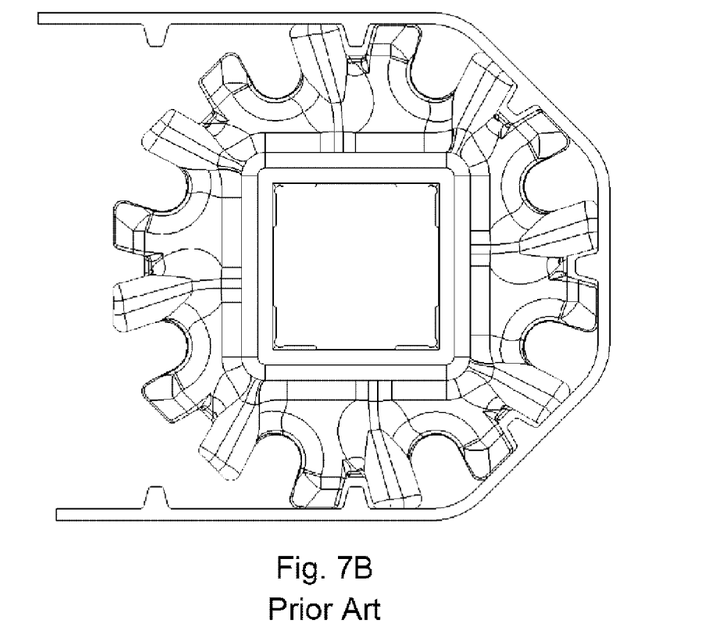
FIG. 7B is a side elevational view of the prior art sprocket with a flexible belt engaged thereon.
Figure 8:
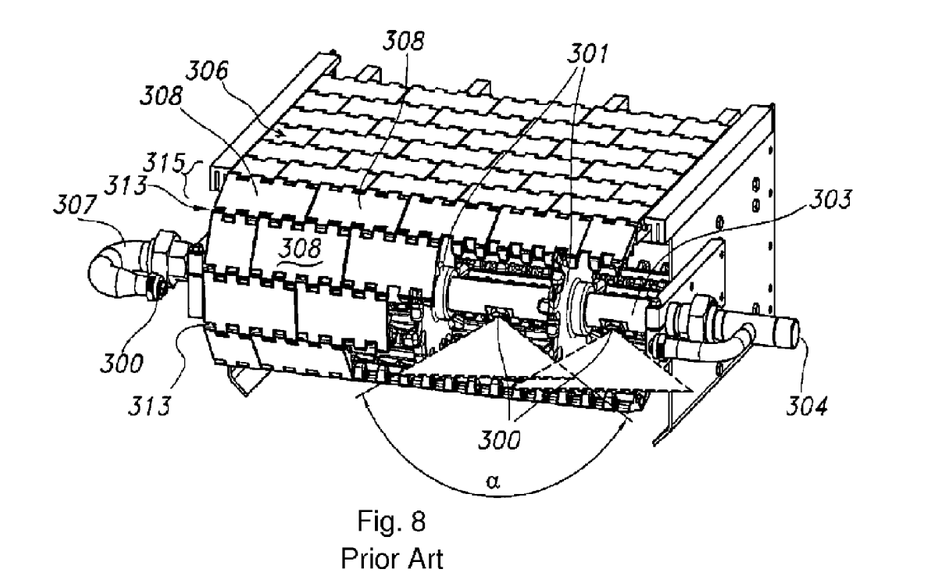
FIG. 8 is a perspective view of a cleaning-in-place system.

These disadvantages have been overcome for modular belts by the sprocket depicted in FIG. 7A in conjunction with the cleaning-in-place system pictured in FIG. 8 (see, e.g., U.S. Patent Application Publication Nos. 2008/0190462 and 2990/0050185). However, the sprocket of FIG. 7A is not ideally suited for use with flexible (non-modular) belts. For example, as depicted in FIG. 7B, the shape of the teeth, and lack of support between adjacent pairs of teeth, allow a flexible belt to buckle as it is forced around the periphery of the sprocket while the belt is under tension. Over time, this buckling causes damage to the belt including cracks on the surface of the belt.

Accordingly, there is a need for an improved sprocket for use with flexible belts and that avoids the above-described shortcomings.

BRIEF SUMMARY OF THE INVENTION

The present invention meets the above-described need by providing a sprocket having a body with a central opening for engaging a shaft and rotating about an axis. The sprocket has a plurality of teeth disposed around the periphery of the body. The teeth are angularly spaced about the axis such that each tooth is spaced from the adjacent teeth by a first opening. Each tooth has a belt-contacting surface which is convex in shape such that the outer-most periphery of the sprocket is generally circular. The belt-contacting surfaces of the teeth guide the belt around the periphery of the sprocket in order to minimize the ability of the belt to buckle.

The first opening may be circular, trapezoidal, or any other shape. The first opening is configured expose the underside of the belt to cleaning fluid.

The teeth may each further comprise a second tooth such that pairs of teeth are disposed around the periphery of the body, the each pair being spaced from the adjacent pair by the first opening. Each tooth of a pair of teeth may be spaced from the other tooth of the pair by a second opening. The second opening is configured to engage a rib of the belt. The second openings may be configured to be larger than the corresponding ribs to allow cleaning fluid to pass between the sprocket and the ribs.

The longitudinal width of the body may be different at an inner portion of the body than at an outer portion of the body. The body may further have a transition portion where the width gradually increases from the inner portion to the outer portion.

The present invention may be embodied as a conveyor belt system comprising a belt which may have transverse ribs. The system further comprises a sprocket similar to that described above.

DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Initially, it should be noted that the terms "belt," "conveyor," "conveyor belt," and "flexible belt" are used interchangeably herein to refer to any non-modular belt as is known in the art. Such a belt may be constructed from fabrics coated by plastics or rubber, coated plastic sheets, monolithic plastic sheets, or other non-modular belt configurations. The terms may be used herein to refer to belts for any application, such as, for example, conveyor belts and process belts.

Figure 1A:
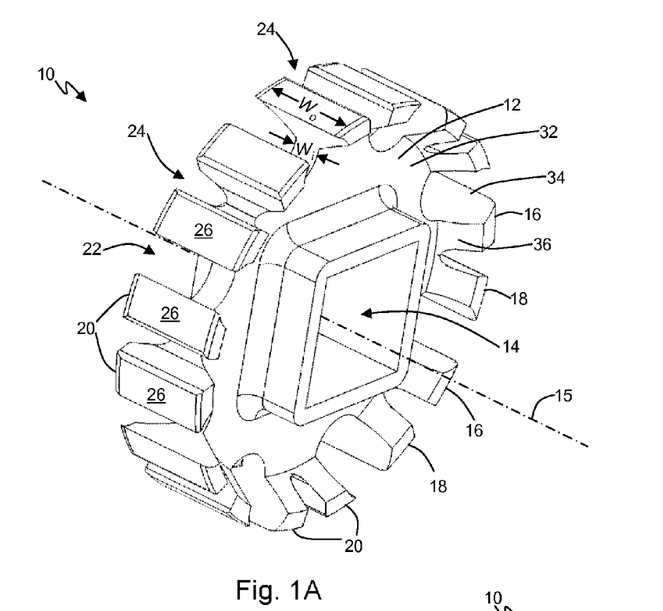
FIG. 1A is a perspective view of a sprocket according to an embodiment of the present invention.
Figure 1B:
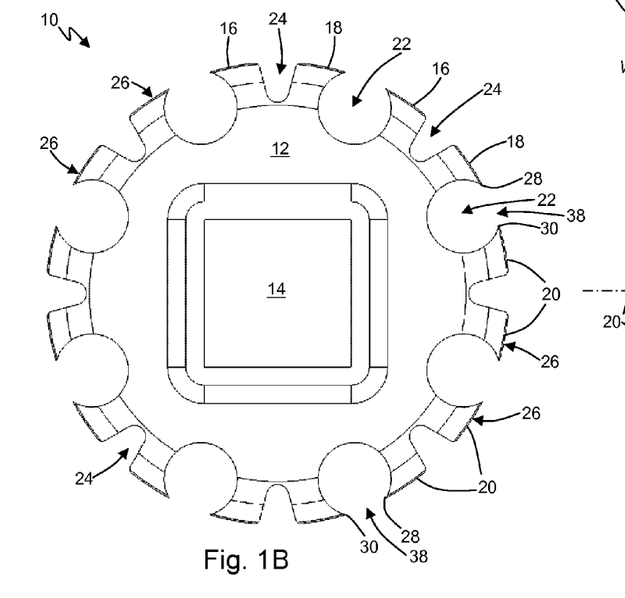
FIG. 1B is a side elevational view of the sprocket of FIG. 1A.
Figure 1C:
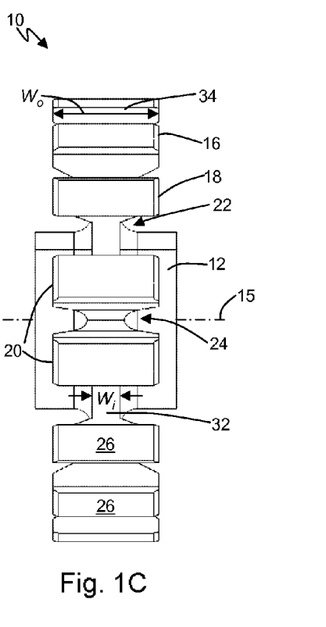
FIG. 1C is an end elevational view of the sprocket of FIGS. 1A and 1B.

FIGS. 1A-1C depict a sprocket 10 according to an embodiment of the present invention. The sprocket 10 comprises a body 12 which may be constructed from stainless steel, plastic, or other suitable materials generally known to be food compatible and easily cleanable. The sprocket 10 includes a central opening 14 for engaging a shaft (not shown). The shaft may be a drive shaft. The central opening 14 may be shaped to cause the sprocket 10 to rotate as the shaft is rotated; for example, the central opening 14 may be formed in the shape of a square. In this manner, the sprocket 10 may rotate about an axis 15 that is coincident with the shaft in order to drive a belt 90 (see, e.g., FIG. 2). The sprocket 10 may be an idling sprocket which is rotated about the axis 15 by movement of the belt 90 around the sprocket 10. The central opening 14 may be formed in other shapes to accommodate different shaft geometries as will be evident to those of ordinary skill in the art based on this disclosure.

The sprocket 10 has a plurality of teeth 16, 18 disposed in pairs 20 around the periphery of the body 12. Each tooth 16, 18 has a belt-contacting surface 26. The belt-contacting surface 26 is convex in shape such that the outer-most periphery of the sprocket 10, as defined by the belt-contacting surfaces 26 of the teeth 16, 18, is generally circular. The discontinuous circle formed by the belt-contacting surfaces 26 of the teeth 16, 18 is centered on the axis 15 and guides the belt 90 around the periphery of the sprocket 10 in order to minimize the ability of the belt 90 to buckle.

Figure 2:
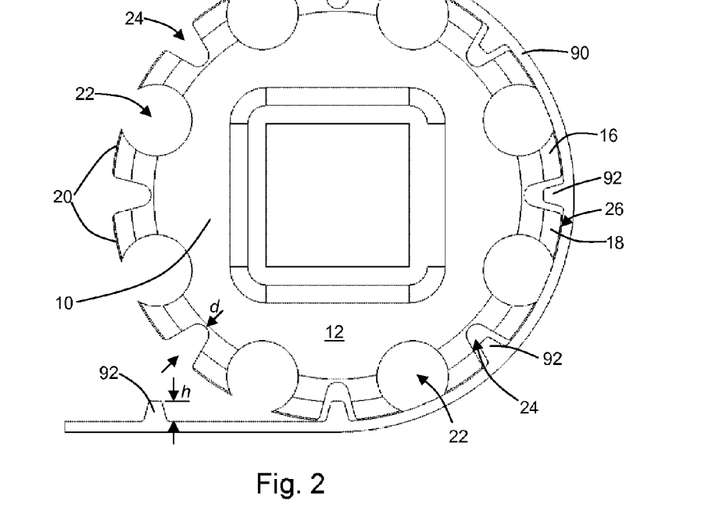
FIG. 2 is a side elevational view of the sprocket of FIGS. 1A-1C with a flexible belt engaged thereon.
Figure 3:
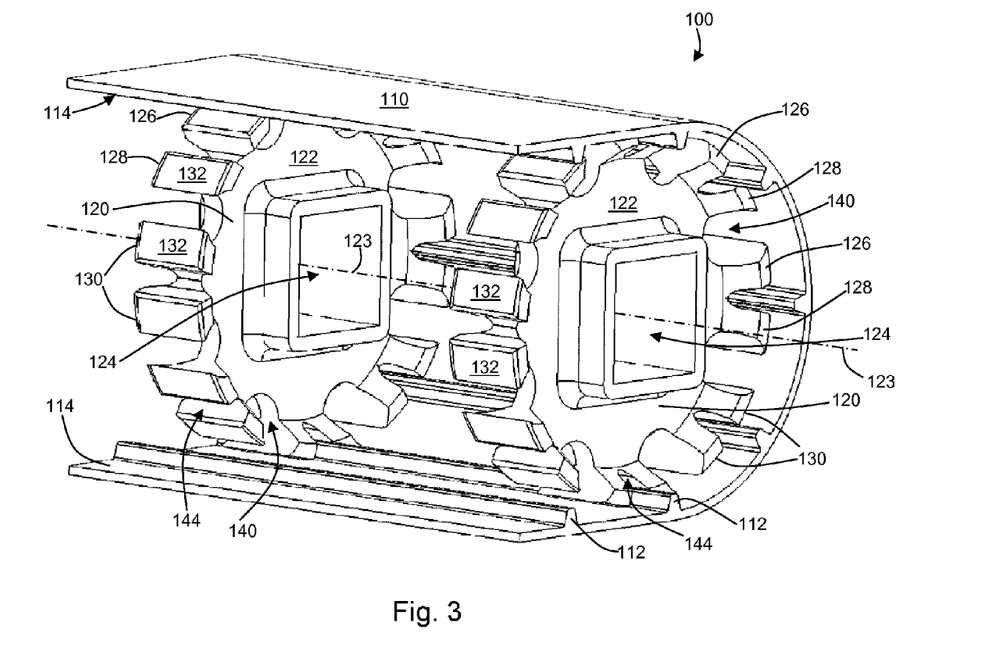
FIG. 3 is a perspective view of system according to an embodiment of the present invention.
Figure 4A:
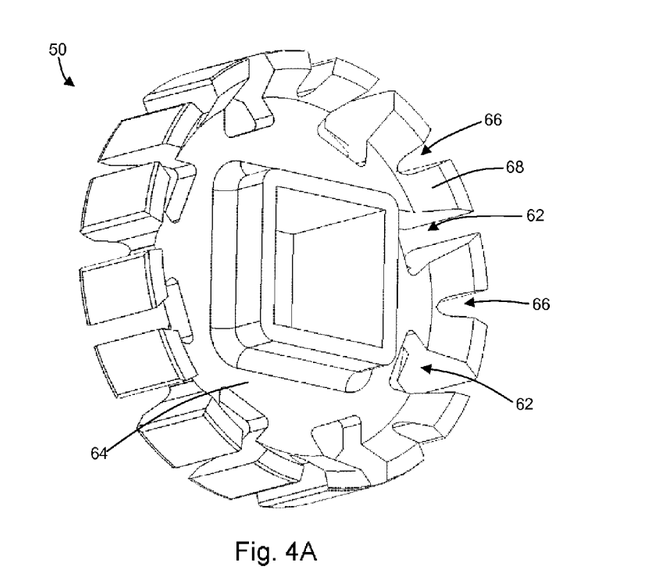
FIG. 4A is a perspective view of a sprocket according to another embodiment of the present invention.
Figure 4B:
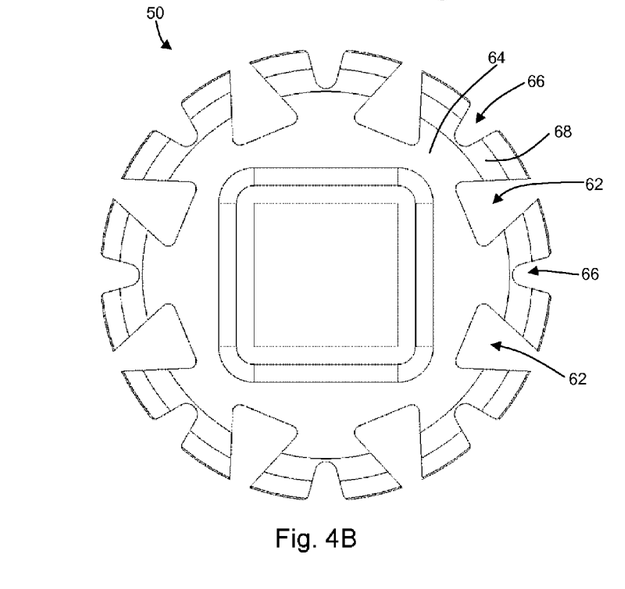
FIG. 4B is a side elevational view of the sprocket of FIG. 4A.
Figure 4C:
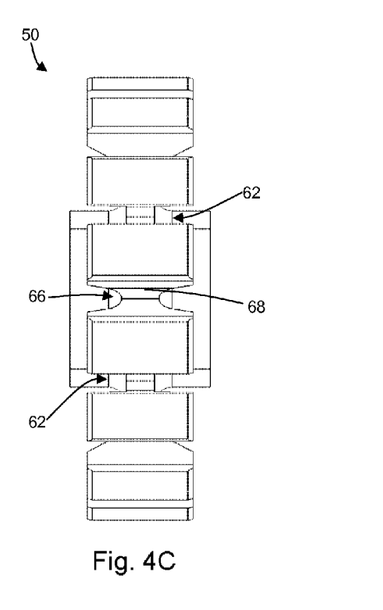
FIG. 4C is an end elevational view of the sprocket of FIGS. 4A and 4B.
Figure 5:
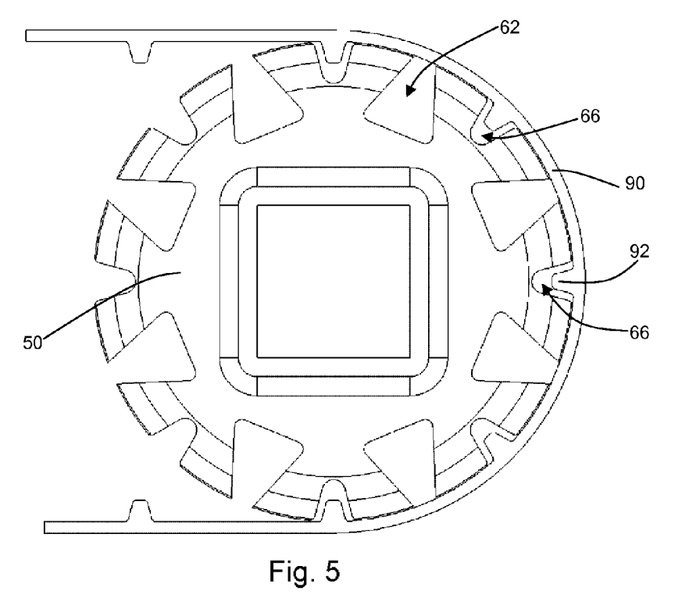
FIG. 5 is a side elevational view of the sprocket of FIGS. 4A-4C with a flexible belt engaged thereon.
Figure 6:
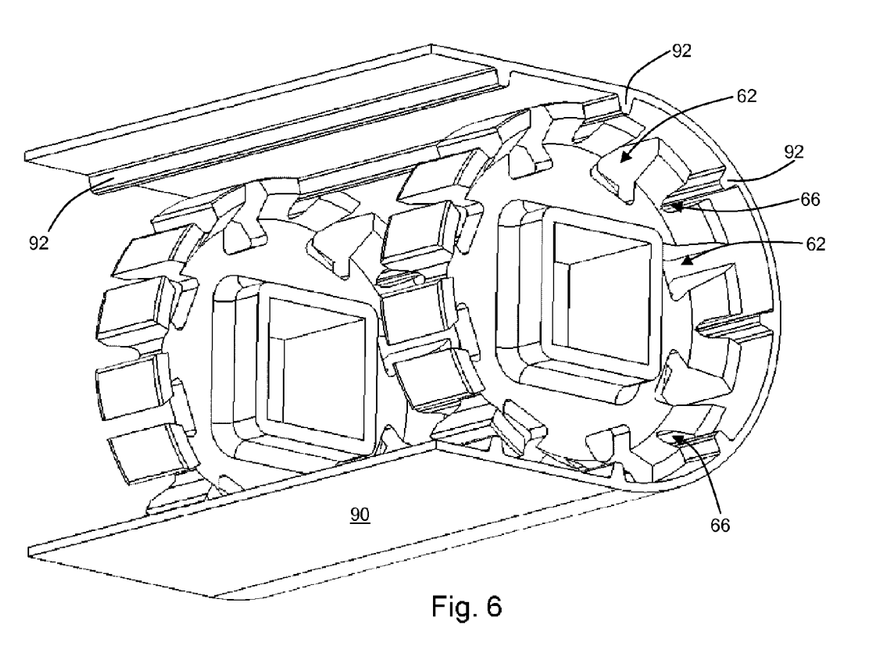
FIG. 6 is a perspective view of two sprockets according to another embodiment of the present invention with a flexible belt engaged thereon.

The pairs 16 of teeth are angularly spaced about the axis 15 such that each pair 16 of teeth is spaced from the adjacent pairs 16 of teeth by a first opening 22. The first opening 22 is configured to align with the underside of the belt 90 when the belt 90 is engaged with the sprocket 10 as best shown in FIGS. 2 and 3. In this way, the first opening 22 allows for cleaning fluid sprayed generally toward the sprocket 10 and belt 90 to reach the underside of the belt 90. The first opening 22 may be shaped to allow access of cleaning fluid to the belt 90 while maintaining a necessary amount of belt-contacting surface 26 of the teeth 16, 18 to prevent buckling of the belt 90.

In the non-limiting example best depicted in FIGS. 1B and 2, the first opening 22 is circular in shape where a chord of the circle intersects with the periphery of the sprocket 10 thus forming edges 28, 30. As such, the wide circular formation of first opening 22 allows ample cleaning fluid to circulate, while the smaller peripheral gap created by edges 28, 30 allows the appropriate belt-contacting surfaces 26 to remain on the teeth 16, 18. The appropriate size of the gap created by edges 28, 30 will depend on the specific application. For example, the stiffness of the belt and/or the number and spacing of ribs in the belt will necessitate more or less support by the belt-contacting surfaces of the teeth of the sprocket. The edges 28, 30 or any edges formed by the elements of the disclosed sprockets may be beveled, rounded, or the like. The gap formed by edges 28, 30 may be considered a belt interface portion 38 of the first opening 22. Such belt interface portion 38 may be narrower than a largest diameter (or dimension) of the first opening.

Another embodiment of a sprocket 50 is depicted in FIGS. 4A-6, wherein the first opening 52 is trapezoidal. Other shapes and sizes suitable for the first opening 22 will be evident to those of ordinary skill in the art based on this disclosure. The first opening 22 may also comprise multiple openings. As such, a belt may be exposed to cleaning fluid at more than one position between the ribs of the belt.

The belt-contacting surfaces 26 of the sprocket 10 may make up approximately 50 percent of the circumference of the sprocket 10 (the first openings 22 and second openings 24 making up the other 50 percent of the circumference). The belt-contacting surfaces 26 may make up more or less then 50 percent of the circumference of the sprocket 10 depending on the application (e.g., belt stiffness, number and spacing of ribs, etc.).

Each tooth 16, 18 of a pair 20 of teeth may be spaced from the other tooth 18, 16 of the pair 20 by a second opening 24. The second opening 24 is configured to engage a rib 92 of the belt 90. The second opening 24 may be, for example but not limited to, tapered in shape to engage a tapered rib 92. The second opening 24 may be configured to be larger than the corresponding rib 92. For example, a depth d of the second opening 24 may be greater in length than a height h of the corresponding rib 92. In this manner, cleaning fluid may pass between the sprocket 10 and the rib 92 while the belt 90 is engaged by the sprocket 10 in order to flush contaminants from the rib 92 area of the belt 90.

The body 12 of the sprocket 10 may have a longitudinal width which varies. For example, as best shown in FIG. 1A, an inner portion 32 of the body 12 may have a width $W_i$ which is less than a width $W_o$ of an outer portion 34 of the body 12. In this manner, the volume of material necessary for the body 12 and the mass of the body 12 may be minimized (due to the relatively narrow width $W_i$ of the inner portion 32) while still providing a large belt-contacting surface 26 (due to the relatively large width $W_o$ of the outer portion 34). The body 12 may further have a transition portion 36 where the width gradually increases from $W_i$ to $W_o$.

The reduced width $W_i$ of the inner portion 32 also has the benefit of improving access of cleaning fluid to the underside of belt 90, especially to a portion of the belt 90 which is located between two sprockets (see, e.g., FIG. 8, which shows where a V-shaped spray of cleaning fluid may be less hindered by a reduced width $W_i$).

The figures depict embodiments of sprockets 10, 50 where the first openings 22, 62 reach the inner portion 30, 64 of the sprocket 10, 50, and the second openings 24, 66 reach the transition portion 34, 68 of the sprocket 10, 50; however, other configurations are possible and contemplated within the scope of this disclosure.

Turning to FIG. 2, the sprocket 10 is shown engaged with the belt 90. The belt-contacting surfaces 26 of the teeth 16, 18 engage with and ease the belt around the periphery of the sprocket 10 and the second openings 24 engage with the transverse ribs 92 of the belt 90. Also, the first openings 22 provide large openings and improved access to the underside of the belt 90 for cleaning when the belt 90 passes over the sprocket 10, while still maintaining sufficient belt-contacting surface 26 to minimize the risk of buckling of the belt 90. The relation of the first openings 22 and the inner portion 30, transition portion 34, and outer portion 32 of the sprocket may allow improved access of the cleaning fluid to the belt 90. Similarly, the varying width of the body 12 at the second openings 24 may allow improve access of the cleaning fluid to the ribs 92.

The present invention may be embodied as a conveyor belt system 100 comprising a belt 110 which may have transverse ribs 112 (see, e.g., FIG. 3). The system further comprises a sprocket 120, similar to that described above, having a body 122 with a central opening 124 for engaging a shaft. A system 100 may comprise more than one sprocket 120. The shaft may be a drive shaft and, in this case, will cause the sprocket 120 to rotate around an axis 123. The sprocket 120 has a plurality of teeth 126, 128 disposed in pairs 130 around the periphery of the body 122. Each tooth 126, 128 has a belt-contacting surface 132 configured to engage the underside 114 of the belt 110. The belt-contacting surfaces 132 are convex in shape such that the outer-most periphery of the sprocket 120, as defined by the belt-contacting surfaces 132 of the teeth 126, 128, is generally circular. The discontinuous circle formed by the belt-contacting surfaces 132 of the teeth 126, 128 is centered on the axis 123 and guides the belt 110 around the periphery of the sprocket 120 in order to minimize the ability of the belt 110 to buckle.

The pairs 130 of teeth are angularly spaced about the axis 123 such that each pair 130 of teeth is spaced from the adjacent pairs 130 of teeth by a first opening 140. The first opening 140 is configured to align with the underside 114 of the belt 110 when the belt 110 is engaged with the sprocket 120 as shown. In this way, the first opening 140 allows for cleaning fluid sprayed generally toward the sprocket 120 and belt 110 to reach the underside of the belt 110. The first opening 140 may be shaped to allow access of cleaning fluid to the belt 110 while maintaining a necessary amount of belt-contacting surface 132 of the teeth 126, 128 in order to prevent buckling of the belt 110.

In the case where the belt 110 has ribs 112, each tooth 126, 128 of a pair 130 of teeth may be spaced from the other tooth 128, 126 of the pair 130 by a second opening 144. The second opening 144 is configured to engage a rib 112 of the belt 110 in order to increase the ability of the sprocket 120 to move the belt 110 (when the sprocket is a drive sprocket). The second opening 144 may be, for example but not limited to, tapered in shape to engage a tapered rib 112. The second opening 144 may be configured to be larger than the corresponding rib 112. For example, a depth of the second opening 144 may be greater in length than a height of the corresponding rib 112. In this manner, cleaning fluid may pass between the sprocket 120 and the rib 112 while the belt 110 is engaged by the sprocket 120 in order to flush contaminants from the rib 112 area of the belt 110.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A sprocket for a non-modular belt having transverse ribs, the sprocket being disposed on a shaft and configured to rotate about an axis coincident with the shaft, the sprocket comprising:
    a body comprising:
        a central opening for receiving the shaft;
        a plurality of teeth disposed in pairs, the pairs being angularly spaced about the axis, wherein each pair of teeth being spaced from adjacent pairs of teeth by a first opening, and wherein each tooth in each pair of teeth being spaced from the other tooth in the pair by a second opening; and
        wherein a belt-contacting surface of each tooth is radially convex about the axis such that the entire outer-most periphery of the body, as defined by the belt-contacting surfaces of the teeth, is generally circular for preventing buckling of the belt.

2. The sprocket of claim 1, wherein the first opening is circular in shape.

3. The sprocket of claim 1, wherein the first opening is trapezoidal in shape.

4. The sprocket of claim 1, wherein a belt interface portion of the first opening is narrower than a largest diameter of the first opening.

5. The sprocket of claim 1, wherein a width in a longitudinal direction of an outer portion of the body is greater than a width of an inner portion of the body.

6. The sprocket of claim 1, wherein a depth of the second opening is greater than a height of a rib of the belt.

7. The sprocket of claim 1, wherein the sprocket is a drive sprocket.

8. The sprocket of claim 1, wherein the sprocket is an idling sprocket.

9. A sprocket for a non-modular belt, the sprocket being disposed on a shaft and configured to rotate about an axis coincident with the shaft, the sprocket comprising:
    a body comprising:
        a central opening for receiving the shaft;
        a plurality of teeth, the teeth being angularly spaced about the drive axis, wherein each tooth is spaced from adjacent teeth by a first opening; and
        wherein a belt-contacting surface of each tooth is radially convex about the axis such that the entire outer-most periphery of the body, as defined by the belt-contacting surfaces of the teeth, is generally circular for preventing buckling of the belt.

10. The sprocket of claim 9, wherein each of the plurality of teeth further comprises a pair of teeth wherein each tooth in each pair of teeth is spaced from the other tooth in the pair by a second opening.

11. The sprocket of claim 10, wherein the first opening is circular in shape.

12. The sprocket of claim 10, wherein the first opening is trapezoidal in shape.

13. The sprocket of claim 10, wherein a belt interface portion of the first opening is narrower than a largest diameter of the first opening.

14. The sprocket of claim 10, wherein a width in a longitudinal direction of an outer portion of the body is greater than a width of an inner portion of the body.

15. The sprocket of claim 10, wherein a depth of the second opening is greater than a height of a rib of the belt.

16. A conveyor belt system comprising:
    a sprocket comprising:
        a body comprising:
            a central opening for receiving a shaft, the shaft configured to rotate about a longitudinal axis;
            a plurality of teeth disposed in pairs, the pairs being angularly spaced about the axis, wherein each pair of teeth being spaced from adjacent pairs of teeth by a first opening, and wherein each tooth in each pair of teeth being spaced from the other tooth in the pair by a second opening; and
            wherein a belt-contacting surface of each tooth is radially convex about the axis such that the entire outer-most periphery of the body, as defined by the belt-contacting surfaces of the teeth, is generally circular for preventing buckling of the belt;
    a non-modular belt configured to contact the belt-contacting surfaces of the teeth of the sprocket;
    a plurality of transverse ribs disposed on the belt and configured to engage the second openings of the sprocket as the belt is conveyed around the sprocket.

17. The conveyor belt system of claim 16, further comprising a second sprocket.

* * * * *